United States Patent Office

2,744,843
Patented May 8, 1956

2,744,843

ENAMEL BONDING BY THE USE OF ARSENIC

Bruce G. Craig, Milwaukee, Wis., assignor to A. O. Smith Corporation, Milwaukee, Wis., a corporation of New York No Drawing. Application May 10, 1951,
Serial No. 225,668

4 Claims. (Cl. 148—6.14)

This invention relates to coating metal with vitreous enamel and more particularly to the use of arsenic to promote adherence between the enamel and the metal.

An object of the present invention is to provide a simple and economical method of bonding vitreous enamel to steel or metal plate.

Another object is to provide a method of adhering vitreous enamel to steel whereby an acid solution of arsenic is employed to chemically bond the two elements.

Still another object is to provide a method of adhering vitreous enamel to steel whereby an adherence promoter is applied to the surface of the steel to be bonded rather than being mixed with the enamel before application thereof to the steel.

Vitreous enamel is frequently applied to the surface of metal articles to aid in preventing corrosion thereof when the articles are exposed to the elements or a corrosive medium during service.

The vitreous enamel or glass is generally sprayed onto the metal surface and fused thereto by subjecting the article to a high temperature in the neighborhood of 1300° to 1600° F. In spite of this high temperature, difficulty is encountered in achieving an effective bond between the two unlike substances. Improper bonding often results in defects in the glass coating when the article is subjected to the usual service conditions.

In view of this, an adherence promoter, generally cobalt, has been employed in the glass composition to strengthen the bond between the glass and the metal. However, there are several disadvantages to the use of cobalt in such a capacity. Cobalt is a relatively expensive element and may from time to time be difficult to obtain in sufficient quantities to be used as an adherence promoter. In addition, the cobalt when mixed with the molten glass composition imparts a blue color thereto which is frequently undesirable.

The present invention is directed to the use of arsenic as an adherence promoter to produce an inexpensive, tightly adherent, colorless bond between the glass and the metal.

The arsenic is preferably employed as a weak arsenic acid, or any arsenic compound which will decompose into arsenic acid when added to water, and is applied directly to the surface of the metal or steel article which is to be subsequently coated with glass. The most economical and effective adherence promotion is achieved with the arsenic acid in a concentration of 2½% to 5%. A concentration of arsenic acid above 25% may generally result in the occurrence of local concentrations of arsenic salts on the dried surface of the steel to which the acid is applied. The application of glass to the steel surface containing these local concentrations of arsenic salts will frequently result in serious defects in the glass coating, such as blisters, peeling and loss of adherence. Therefore, to promote the most desirable adherence the arsenic acid concentration should preferably be below 25% and for economy between 2½% and 5%.

However strong concentrations, above 25%, of arsenic acid may be employed if the metal to which the acid is applied is rinsed with water after the arsenic acid has dried on the metal surface. This rinse washes away or dissolves the excess or local concentrations of arsenic salts and an effective bonding may then be obtained between the steel and the glass.

It is essential that an acid solution of arsenic be employed to strengthen the bond between the glass and the steel, for an alkaline solution will not promote adherence to an appreciable degree.

The steel surface to which the glass coating is to be applied is thoroughly cleaned of all oil and foreign material by any convenient method such as sandblasting or pickling.

As the arsenic acid, and arsenic compounds in general, are not generally sprayed because of the toxic effect of the arsenic vapor, the arsenic acid is independently applied to the previously cleaned steel article which is to be subsequently coated with glass, rather than being added to the glass and sprayed onto the steel. This independent application of arsenic may be accomplished by dipping or slushing the cleaned article in an arsenic acid bath at room temperature.

After the quick dip, the article is immediately dried by any convenient means. An insoluble compound, which is taken to be an iron arsenate, is formed at the surface of the steel article. This compound is tightly adherent to the steel surface and, being insoluble, cannot be dissolved away by a subsequent water rinse.

The dried steel article may then be given a water rinse, particularly if a strong acid solution had been employed, to remove any local concentrations of arsenic and thereby leave a uniform coating of iron arsenate on the steel surface.

To provide a thicker arsenate coating and insure greater adherence, it may be desirable to give the steel article a double dip in the arsenic acid bath. That is, the article is dipped, dried, dipped, dried, and then rinsed.

The article, if rinsed, is again dried and the vitreous enamel or glass is sprayed on the dried surface thereof. The composition of the enamel and the method of applying the same to the steel are well known in the art and are not claimed as part of the present invention.

The glass coated article is then subjected to a high temperature and the glass reacts chemically with the intermediate arsenate coating on the steel surface to form a tightly adherent intergranular bond between the glass and the steel.

This invention eliminates the necessity of mixing the adherence promoter with the molten glass before spraying the same onto the metal article. The arsenic is applied directly to the metal rather than incorporated in the glass and as such, the invention is particularly adapted to small steel articles such as hot water tanks, which may be conveniently coated with the arsenic acid by dipping. The resulting bond between the glass and the metal is tightly adherent and colorless and will not peel or blister under ordinary service conditions.

Since the arsenic is applied directly to the metal base in a weak solution which is water-rinsed, danger of poisonous effects from the arsenic are eliminated even though defects might appear in the enamel in service.

Various embodiments of the invention may be employed within the scope of the following claims.

I claim:

1. An improvement in the bonding of vitreous enamel to steel comprising applying a composition consisting essentially of weak arsenic acid to the surface of the steel to be covered with enamel, said acid having a concentration of less than 25% by weight and reacting with said steel to form a tightly adherent insoluble coating thereon, covering the coated steel with a glass composition, and subjecting the glass covered steel to a high temperature in the range of 1300° to 1600° F. to fuse the composition with the intermediate coating reacting with the glass to form a bond between said glass and the steel.

2. A method of bonding vitreous enamel to steel comprising cleaning the steel surface to which the enamel is to be applied, applying a composition consisting essentially of weak arsenic acid to said cleaned surface, said acid having a concentration of about 2½% to about 5% by weight and reacting with said steel surface to form a tightly adherent coating thereon, drying said coated surface, covering the coated surface with a vitreous enamel composition, and subjecting the enamel covered surface to a high temperature in the range of 1300° to 1600° F. with the intermediate coating reacting with the enamel to bond said enamel to the steel surface.

3. An improvement in the bonding of vitreous enamel to steel comprising, applying a substances consisting essentially of arsenic acid to the metal surface to be covered with enamel, said acid having a concentration of about 2.5% to about 25% by weight and reacting with said steel to form a tightly adherent insoluble arsenate coating thereon, rinsing the coated steel surface to remove local concentrations of excess acid from the surface with the insoluble arsenate remaining on said surface, covering said coated surface with a vitreous enamel composition, and subjecting the enamel covered surface to a high temperature in the range of 1300° to 1600° F. with the intermediate coating reacting with the enamel to bond said enamel to the steel surface.

4. An improvement in the bonding of glass to steel comprising, cleaning the steel surface to which the glass is to be applied, applying a composition consisting essentially of arsenic acid to the cleaned surface, said acid having a concentration of about 2.5% to 25% by weight and reacting with the steel to form a tightly adherent insoluble coating on the steel surface, drying said coated surface, rinsing said coated surface to remove local concentrations of excess acid from the surface with the insoluble coating remaining on said surface, covering said coated surface with a glass composition, and subjecting the glass covered surface to a high temperature in the range of 1300° to 1600° F. to bond the glass to the intermediate coating and the steel surface.

References Cited in the file of this patent

UNITED STATES PATENTS

| | | |
|---|---|---|
| 43,630 | De Bussy | July 19, 1864 |
| 1,377,174 | Allen | May 10, 1921 |
| 1,583,006 | Pierce et al. | May 4, 1926 |
| 2,005,780 | Gravell | June 25, 1935 |
| 2,301,983 | Tanner | Nov. 17, 1942 |
| 2,314,565 | Thompson | Mar. 23, 1943 |

FOREIGN PATENTS

| | | |
|---|---|---|
| 358,886 | Great Britain | Oct. 8, 1931 |